United States Patent
Dudding

(10) Patent No.: US 11,462,909 B2
(45) Date of Patent: Oct. 4, 2022

(54) METHODS, SYSTEMS AND COMPUTER PROGRAM PRODUCTS FOR REDUCING INSTABILITY IN THE POWER GRID

(71) Applicant: Sensus Spectrum, LLC, Morrisville, NC (US)

(72) Inventor: Andrew Dudding, Cary, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 0 days.

(21) Appl. No.: 17/341,624

(22) Filed: Jun. 8, 2021

(65) Prior Publication Data

US 2021/0384726 A1    Dec. 9, 2021

Related U.S. Application Data

(60) Provisional application No. 63/036,602, filed on Jun. 9, 2020.

(51) Int. Cl.
*H02J 3/00* (2006.01)
*H02J 3/16* (2006.01)
*H02J 3/18* (2006.01)

(52) U.S. Cl.
CPC ............ *H02J 3/003* (2020.01); *H02J 3/16* (2013.01); *H02J 3/1821* (2013.01); *H02J 2300/24* (2020.01); *H02J 2300/28* (2020.01)

(58) Field of Classification Search
CPC ...... H02J 3/003; H02J 3/16; H02J 3/18; H02J 3/21; H02J 2300/22; H02J 2300/24; H02J 2300/28
USPC .......................................................... 307/57
See application file for complete search history.

(56) References Cited

U.S. PATENT DOCUMENTS

| | | | |
|---|---|---|---|
| 7,923,862 B2 | 4/2011 | Cardinal et al. | |
| 8,831,788 B2 | 9/2014 | Flynn et al. | |
| 8,935,111 B2 | 1/2015 | Vartanian et al. | |
| 9,246,334 B2 | 1/2016 | Ansari et al. | |
| 9,478,987 B2 * | 10/2016 | Nelson .................... | H02J 3/381 |
| 9,568,900 B2 | 5/2017 | Potter et al. | |
| 10,218,181 B2 | 2/2019 | Huomo et al. | |

(Continued)

OTHER PUBLICATIONS

International Search Report and Written Opinion, PCT/US2021/036325, dated Oct. 4, 2021, 13 pages.

*Primary Examiner* — Hal Kaplan
(74) *Attorney, Agent, or Firm* — Stanek Lemon Crouse & Meeks, PA

(57) ABSTRACT

A method for identifying report triggering events in a power grid to improve stability in the power grid is provided. Energy flow information in the power grid is measured and report triggering events during a predetermined period of time are identified. The report triggering events include at least a predetermined number of load flow transitions where energy flows back from a load associated with the power grid to the power grid during the predetermined period of time and/or exceeding a threshold of time where an energy flow phase angle between voltage and current remains at or near 90 or 270 degrees indicating pure volt-ampere reactive (VAR) operation during the predetermined period of time. A report associated with each of the identified report triggering events is generated and includes a location indicating where the report triggering event occurred in the power grid. The reports are transmitted.

18 Claims, 4 Drawing Sheets

(56) References Cited

U.S. PATENT DOCUMENTS

| | | |
|---|---|---|
| 11,056,913 B2* | 7/2021 | Matan ..................... H02J 3/18 |
| 11,277,026 B2* | 3/2022 | Okino ..................... H02J 3/46 |
| 2011/0109085 A1 | 5/2011 | Nelson |
| 2018/0366978 A1 | 12/2018 | Matan et al. |
| 2019/0154275 A1 | 5/2019 | Ogawa et al. |
| 2019/0181681 A1 | 6/2019 | Okino |

* cited by examiner

METHODS, SYSTEMS AND COMPUTER PROGRAM PRODUCTS FOR REDUCING INSTABILITY IN THE POWER GRID

CLAIM OF PRIORITY

The present application claims priority from U.S. Provisional Application No. 63/036,602, filed on Jun. 9, 2020, entitled METHODS, SYSTEMS AND COMPUTER PROGRAM PRODUCTS FOR REDUCING INSTABILITY IN THE POWER GRID, the contents of which are hereby incorporated herein by reference as if set forth in their entirety.

FIELD

The present inventive concept relates generally to renewable energy sources and, more particularly, to reducing instability in the power grid caused by the presence of a renewable power source.

BACKGROUND

A power grid is a system of producers and consumers of electricity. For example, the power grid may include power generators, the users of electricity, switches that control the electricity, and the system of substations, power lines, and transformers that deliver the electricity. More recently, power grids have become "smart." The main difference between the smart grid and conventional power grid is that the smart grid is based on demand follows supply while the conventional power grid is based on supply follows demand. In other words, the smart grid may include "smart devices" that can communicate with one another and allow needs of the grid to be predicted and supplied on the basis of these communications.

More recently, renewable energy sources have been introduced into the power grid. A renewable energy source may be any source that is naturally replenished, for example, energy derived from solar, wind, geothermal or hydroelectric action. Energy produced from the refining of biomass is also often classified as renewable. In contrast, coal, oil or natural gas are considered finite sources. As the use of the available sources of renewable energy sources increase and are connected to the existing power grid, electricity utilities are experiencing increased "load flow transitions." A "load flow transition" is a changeover point where energy no longer flows from the power grid to the load/customer (delivered), but flows back from the load to the power grid (received), where the load/customer is co-located with a renewable energy source, for example, a solar panel array. In other words, the renewable energy source "replaces" a certain amount of power that was historically provided by the power grid, so a certain amount of energy is returned to the power grid. Load flow transitions are not an unexpected occurrence, however, with the introduction of renewable energy sources into the power grid, these load flow transitions may occur more frequently than is desired. Too many load flow transitions can lead to instability in the power grid.

SUMMARY

Some embodiments of the present inventive concept provide a method for identifying report triggering events in a power grid to improve stability in the power grid. The method includes measuring energy flow information in the power grid and identifying report triggering events in the measured energy flow information during a predetermined period of time. The report triggering events include at least a predetermined number of load flow transitions where energy flows back from a load associated with the power grid to the power grid during the predetermined period of time and/or exceeding a threshold of time where an energy flow phase angle between voltage and current remains at or near 90 or 270 degrees indicating pure volt-ampere reactive (VAR) operation during the predetermined period of time. A report associated with each of the identified report triggering events is generated. The report includes a location indicating where the report triggering event occurred in the power grid. The reports are transmitted for each of the identified report triggering events.

In further embodiments of the present inventive concept, generating the report may be preceded by storing the energy flow information.

In still further embodiments of the present inventive concept, the transmitting may be followed by receiving the report including the location indicating where the report triggering event occurred in the power grid; investigating the report triggering event; and generating one or more solutions to the report triggering event, wherein executing one of the report triggering events improves the stability of the power grid.

In some embodiments, one of the one or more solutions may include one of providing local storage in locations of the power grid that are producing excess energy and disconnecting a local generator to prevent excess energy delivery to the power grid.

In further embodiments, the predetermined number of load flow transitions may change based on a time of day.

In still further embodiments, the method may further include determining an amplitude of current during the predetermined period of time; determining if the determined current amplitude exceeds a predetermined threshold; and generating a report for the determined current amplitude if it exceeds the predetermined threshold rendering this a report triggering event.

In some embodiments, determining if at least a predetermined number of load flow transitions where energy flows back from a load associated with the power grid to the power grid during the predetermined period of time have occurred may include determining if at least a predetermined number of load flow transitions having a specific step size, wherein the step size is one of a size of change in phase-angle of power; a total change in watts from delivered to received or received to delivered; and the load flow transition exceeds a fixed threshold of watts where a threshold sits on a watts delivered line and a watts received line.

In further embodiments, the predetermined number of transitions may include at least three successive measurements, within which a quadrant 1 (Q1) to quadrant 2 (Q2) or a Q2 to Q1 transition exists and a total transition step may be greater than at least three degrees per the total predetermined period of time. Similarly, the predetermined number of transitions may be at least three successive measurements, within which a quadrant 3 (Q3) to quadrant 4 (Q4) transition or Q4 to Q3 transition exist and the total transition step may be greater than at least N degrees per the total predetermined period of time, wherein N is any number greater than zero.

In still further embodiments, the predetermined period of time may be no greater than 1 second.

Related system are also provided.

DETAILED DESCRIPTION

Figure 1:
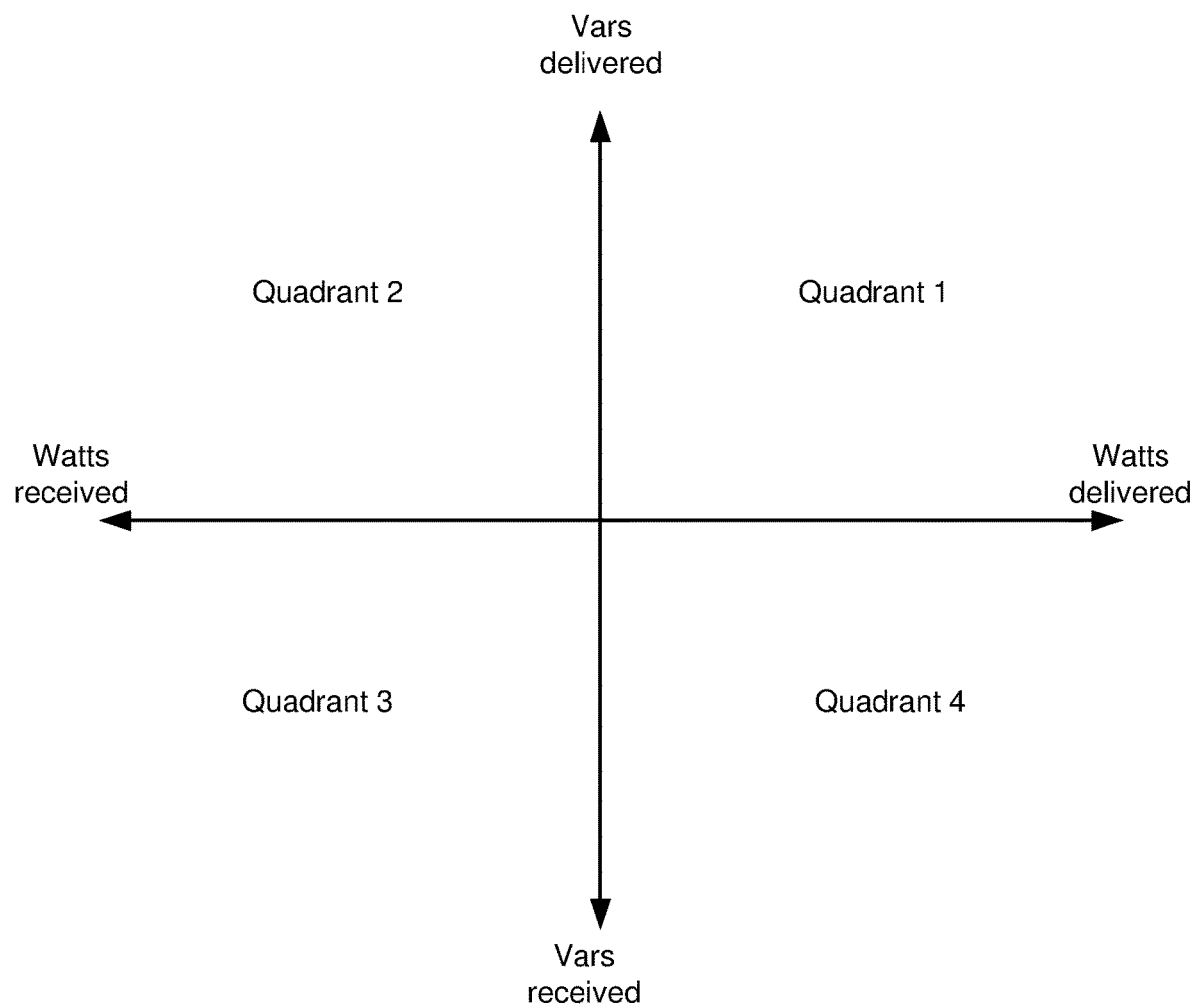
FIG. 1 is a diagram illustrating four quadrants in a power grid in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, as the use of available sources of renewable energy increases and these renewable energy sources are connected to the existing power grid, electricity utilities are experiencing increased "load flow transitions." A "load flow transition" is a changeover point where energy no longer flows from the power grid to the load/customer (delivered), but flows back from the load to the power grid (received), where the load/customer is co-located with a renewable energy source, for example, a solar panel array. In other words, the renewable energy source "replaces" a certain amount of power that was historically provided by the power grid, so a certain amount of energy is returned to the power grid. This particular situation is illustrated in, for example, FIG. 1. Load flow transitions are not an unexpected occurrence. However, with the introduction of renewable energy sources into the power grid, these load flow transitions may occur more frequently than is desired. Too many load flow transitions can lead to instability.

For example, too many load flow transitions can lead to instability of the power grid where grid voltage and frequency become difficult to control. Accordingly, some embodiments of the present inventive concept provide methods for capturing, logging and reporting transitions of power load flow (load flow transitions) and periods of "pure Var Operation" as they occur between the power source and load over a period of time. As used herein, "pure Var Operation" refers to where the phase angle between current and voltage approaches 90 degrees (positive and negative). In other words, at pure Var no useful work (transformation of electrical energy to mechanical energy, heat, light, sound, and the like) is being done with the transfer of energy to or from the grid, yet current is flowing to or from the grid. Pure Var would be almost fully reactive energy as opposed to active energy. In electric power transmission and distribution, volt-ampere reactive (var) is a unit by which reactive power is expressed in an alternating current (AC) electric power system. If utilities knew when these periods of pure var were occurring, this data may allow a deeper understanding and control of load flow conditions, leading to greater power grid stability and greater efficiency in electric energy generation.

In particular, if an electricity utility has the data captured, logged and reported in accordance with embodiments of the present inventive concept, the electric utility may be able to pinpoint specific locations on the grid that cause the majority of grid stability problems and may be able to focus technologies and resources, such as energy storage, into those specific locations rather than taking a haphazard try-it-and-see approach, or a solution directed at a whole distribution line. Pinpointed solutions enabled by embodiments of the present inventive concept discussed herein may also be significantly cheaper in implementation, by only focusing on specific 'bad actors' along a distribution path as will be discussed further below with respect to the figures.

FIG. 1 illustrates four energy quadrants, in particular, Quadrant 1 (lagging current inductive); Quadrant 2 (leading current capacitive); Quadrant 3 (lagging current inductive) and Quadrant 4 (leading current capacitive). Some meters are configured to measure energy flow in all of these quadrants. For example, the StratusIQ electric meter provided by Sensus has the ability to measure the energy flow in all energy quadrants. It will be understood that embodiments of the present inventive concept are not limited to the StratusIQ meter or even meters provided by Sensus, any meter having the ability to measure the necessary flows can be used in accordance with embodiments of the present inventive concept without departing from the scope of the present inventive concept. FIG. 1 illustrates a definition of the quadrants. Quadrant definitions are used to enable discussion about the nature of the flow of power, for example, "[t]he energy was largely in Quadrant 1 during the morning but switched to Quadrant 3 in the afternoon."

For example, in some embodiments, load flow transitions are identified from load flows that transition the Q1-Q2 boundary in either direction or the Q3-Q4 boundary in either direction. Each of these transitions may be logged. The logged information (transition metrics) may be stored and a report may be generated. It will be understood that the circumstances that cause a report to be generated based on the logged information may be customizable and can be changed over time based on the observed performance of the system. For example, a threshold number of load flow transitions may be set to a particular number "N" within a particular period of time. If the number of load flow transitions exceeds "N" within a set period of time, a report may be generated and transmitted. Once the situation is reported, that particular area of the grid may be studied and a solution for the particular situation may be devised. For example, excess energy created for a particular load may be stored instead of wasted or the local generator might be disconnected by the utility to prevent excess energy delivery to the grid. It will be understood that embodiments of the present inventive concept are not limited to the examples herein, these particular situations are provided for example only.

Once the report is generated, the report may be transmitted over a wireless or wired communications link using, for example, FlexNet. As discussed above, embodiments of the present inventive concept may be implemented in a smart grid includes devices capable of communicating with each other. Periods of time where a "power phase angle" dwells around the above stated boundaries may be considered to be "Pure Var Operation." As used herein, "power phase angle" refers to the phase angle between the voltage and current as measured by the meter. Pure Var Operation metrics may also be gathered and provided in a report that may be transmitted over a wireless or wired communications link. It will be understood that any metrics may be monitored, recorded, stored etc. in accordance with embodiments discussed herein, therefore, embodiments are not limited to the specific metrics discussed herein. The metrics monitored in accordance with embodiments discussed herein are generically referenced as "energy flow information" throughout the specification. This energy flow information is monitored, measure, recorded and stored as will be discussed further herein.

Figure 2:
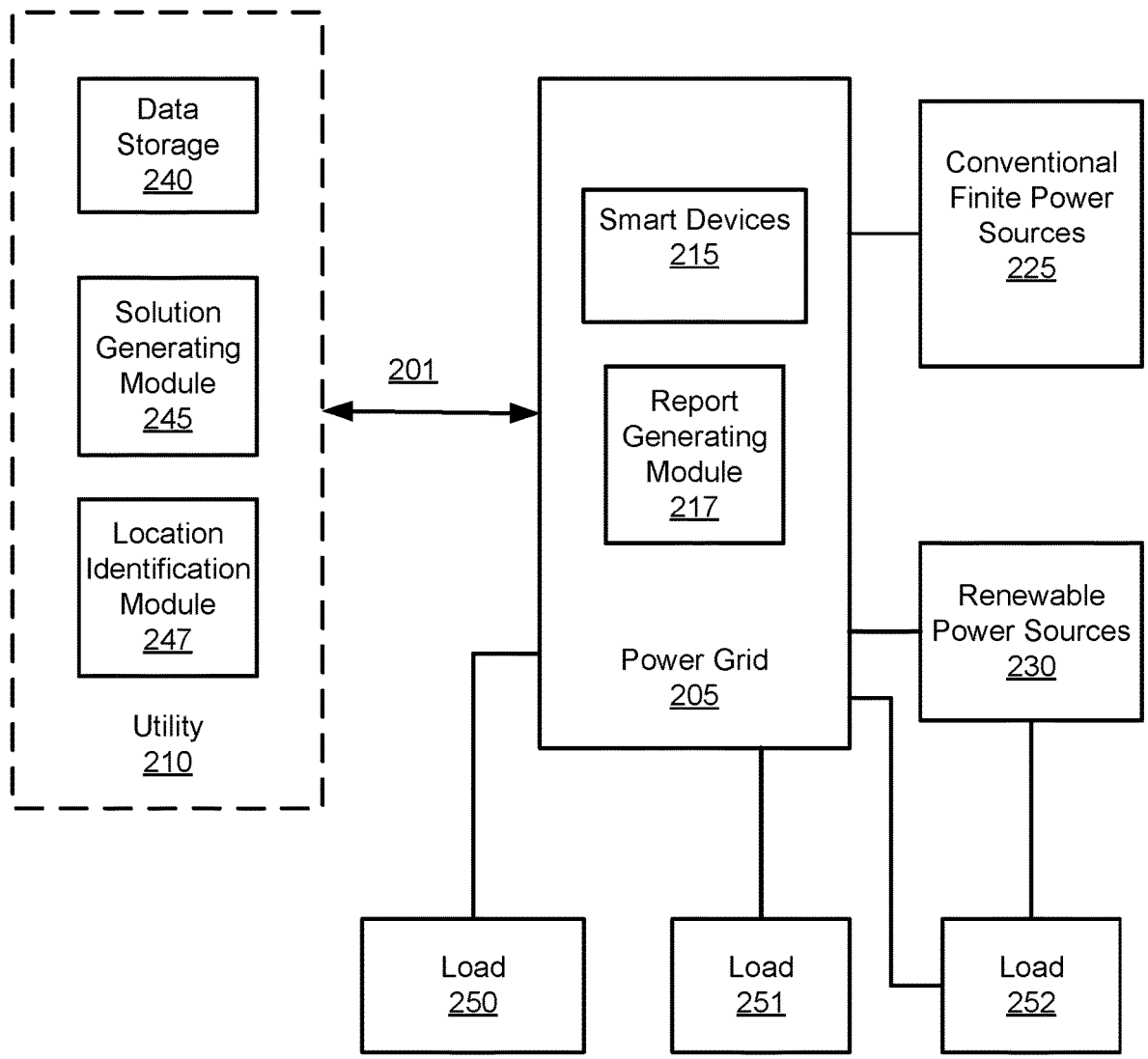
FIG. 2 is a block diagram illustrating a system including a power grid having finite and renewable power sources in accordance with some embodiments of the present inventive concept.

Referring now to FIG. 2, a system 200 including a power grid having finite and renewable source of energy will be discussed. As illustrated in FIG. 2, the system 200 includes a power grid 205, conventional finite power sources 225, renewable power sources 230, a utility 210 and a series of loads 250, 251 and 252. Although FIG. 2 illustrates a particular number of each element, it will be understood that this system 200 is only provided as an example. Thus, embodiments of the present inventive concept are not limited to this configuration. For example, there may be more than one utility and more or less than three loads.

As discussed above, a power grid is a system of producers and consumers of electricity. For example, the power grid may include power generators, the users of electricity, switches that control the electricity, and the system of substations, power lines, and transformers that deliver the electricity. As illustrated in FIG. 2, the power grid includes smart devices 215, for example, smart meters that can communicate with the other devices, loads and utility over a communication line 201. This communication line 201 can be wired or wireless without departing from the scope of the present inventive concept. The power grid 205 receives energy from both finite 225 and renewable 230 energy sources. A finite energy source 225 may include, for example, coal, oil or natural gas. A renewable energy source 230 may be any source that is naturally replenished, for example, energy derived from solar, wind, geothermal or hydroelectric action. As illustrated in FIG. 2, the renewable energy sources 230 may be connected to the power grid 205 and/or to a specific load 252. For example, solar panels on a home or building (load) may provide power directly to the home or building and not to the power grid 205. However, a solar farm may provide power directly to the power grid 205, which then may be distributed to the various loads 250, 251 and 252. The loads 250, 251 and 252 may be any entity that consumes power from the power grid, for example, residential homes, office buildings and the like.

As discussed above, embodiments of the present inventive concept monitor the power grid for situations that meet any criteria that may indicate instability, for example, the number of flow transitions exceeding a threshold N in a particular period of time. If one of these situations occurs, a report generating module 217 associated with the power grid 205 generates a report and transmits the report to, for example, a utility 210, over the communication link 201. The data storage module 240, the solution generating module 245 and the location identification module 247 may receive the report, store the necessary data and determine the location of the problem causing the reported instability. Once the location is determined, a solution to the localized problem may be generated and implemented to reduce instability in the power grid. Although the various modules are shown as being positioned at the utility or in the power grid, embodiments of the present inventive concept are not limited thereto. Modules in accordance with embodiments discussed herein may be located in any portion of the system 200 without departing from the scope of the present inventive concept.

Various definitions and situation in accordance with embodiments of the present inventive concept will be discussed. A "Delivered Var" transition, in some embodiments, is defined as a minimum of three successive measurements, within which a Q1 to Q2 transition or Q2 to Q1 transition exists, and where the total transition step is greater than at least N degrees per the total measurement period, where N is any number greater than zero. For example, in some embodiments, a total step greater than at least three degrees may be significant. The measurement period may vary based on the system as will be further discussed below. It will be understood that transitions can occur between other quadrants. For example, transitions between Q1 and Q3 may also be considered in accordance with various embodiments of the present inventive concept.

A "Received Var" transition, in some embodiments, is defined as a minimum of three successive measurements, within which a Q3 to Q4 transition or Q4 to Q3 transition exists, and where the total transition step is greater than at least N degrees per the total measurement period, where N is any number greater than zero. For example, in some embodiments, a total step greater than at least three degrees may be significant. It will be understood that transitions can occur between other quadrants. For example, transitions between Q4 and Q2 may also be considered in accordance with various embodiments of the present inventive concept.

The total measurement period can be determined from many available sources within a smart device, for example, a StratusIQ electric meter. Energy measurements may be made at a multitude of measurement rates and any of these measurement time periods may be used to determine load flow transitions. In some embodiments, a typical energy measurement period may be every second (1 s).

In some embodiments, aspects of the present inventive concept may be triggered by transition steps. For example, certain customers may be interested in transitions that exceed a certain "step size," therefore a total transition step size may be a configurable item in determining a load flow transition event that will result in a logged and transmitted report in accordance with embodiments discussed herein. As used herein, a "step size" refers to the size of the change in phase-angle of the power, or the total change in watts from delivered to received or received to delivered, or the load flow transition exceeds a fixed (configurable) threshold of watts where the threshold sits on the watts delivered line and the watts received line.

Similarly, some customers may be interested in transitions that occur within a certain time period, therefore the measurement time period may be a configurable item in determining a load flow transition event that will result in a logged and transmitted report in accordance with embodiments discussed herein.

While a certain number of "transitions" per time period may be acceptable, there is a point at which the number of transitions exceeds a configurable level. This level may be different for each system. Once this configurable threshold has been exceeded, then the event will be logged and a report transmitted in accordance with embodiments discussed herein.

At certain times of the day more transitions may be acceptable and at others the same number of transitions may be unacceptable. In other words, an increase in traffic may increase the acceptable number of transitions. Some devices used in accordance with embodiments discussed herein include the capability to determine time of day. For example, the StratusIQ electricity meter includes a Time-of-Use feature as well as other time-interval metering features, which may be used to determine if the number of transitions has exceeded a threshold of acceptability for the particular time of day. If it is determined to be unacceptable, a report may be generated and transmitted in accordance with embodiments discussed herein.

Some embodiments of the present inventive concept include devices including a demand feature. When, for example, a meter has the Demand metering feature enabled, a load flow transition record may be generated and transmitted for each demand interval. This data may be considered to be a coincident demand record and is logged as transmitted such.

In some embodiments, when the energy transfer happens at phase angles very close to Pure Vars delivered or received as discussed above, the grid is in a potentially unstable or meta-stable condition where local load flows can rapidly transition between delivered and received flows. When the energy flow phase angle remains at or near 90 or 270 degrees, this event may be logged and a report transmitted in accordance with some embodiments discussed herein.

In some embodiments, particular customers may additionally be interested in phase angles near Pure Vars that fit a specific range of angles, therefore the Pure Var phase angle range may be a configurable item when determining an Operation at Pure Vars event. Similarly, certain customers may additionally be interested in delivered or received phase angles that fit a specific range of angles. Therefore, the Pure Var event may also indicate if the Pure Vars are delivered or received.

In some embodiments, customers may be interested in a duration of operation at or near pure Var phase angles. Thus, the Pure Var Duration range may be configurable item when determining an Operation at Pure Vars event. While a certain amount of time spent at or near Pure Vars may be acceptable, there will be a point at which that amount of time exceeds a configurable level. Once this configurable threshold has been exceeded, an event may be logged and will be logged and a report generated in accordance with some embodiments of the present inventive concept.

In some embodiments, customers may be interested in situations where the amplitude of the energy involved is significant. To determine the significance of any Load Flow Transition or Pure Var Operation, the amplitude of the current during the measurement time period may be determined. If the current amplitude is above a configurable threshold, the event is considered significant and merits recording and transmission in accordance with embodiments discussed herein. If the current amplitude is below a configurable threshold, the event may be considered insignificant and may not merit recording or transmission.

The conditions discussed above as triggering recording and transmission of an event may be generally referred to herein as "report triggering events." It will be understood only examples of these events are discussed herein and, therefore, embodiments of the present inventive concept are not limited to these examples. Should any of the above conditions (report triggering events) be triggered, it may be possible to measure, log and transmit associated energy and power data that is coincidentally occurring at the same time as the triggered condition. Examples of pertinent coincident data includes, for example, the most recent Voltage snapshot, Frequency snapshot, Current snapshot, and the like.

Figure 3:
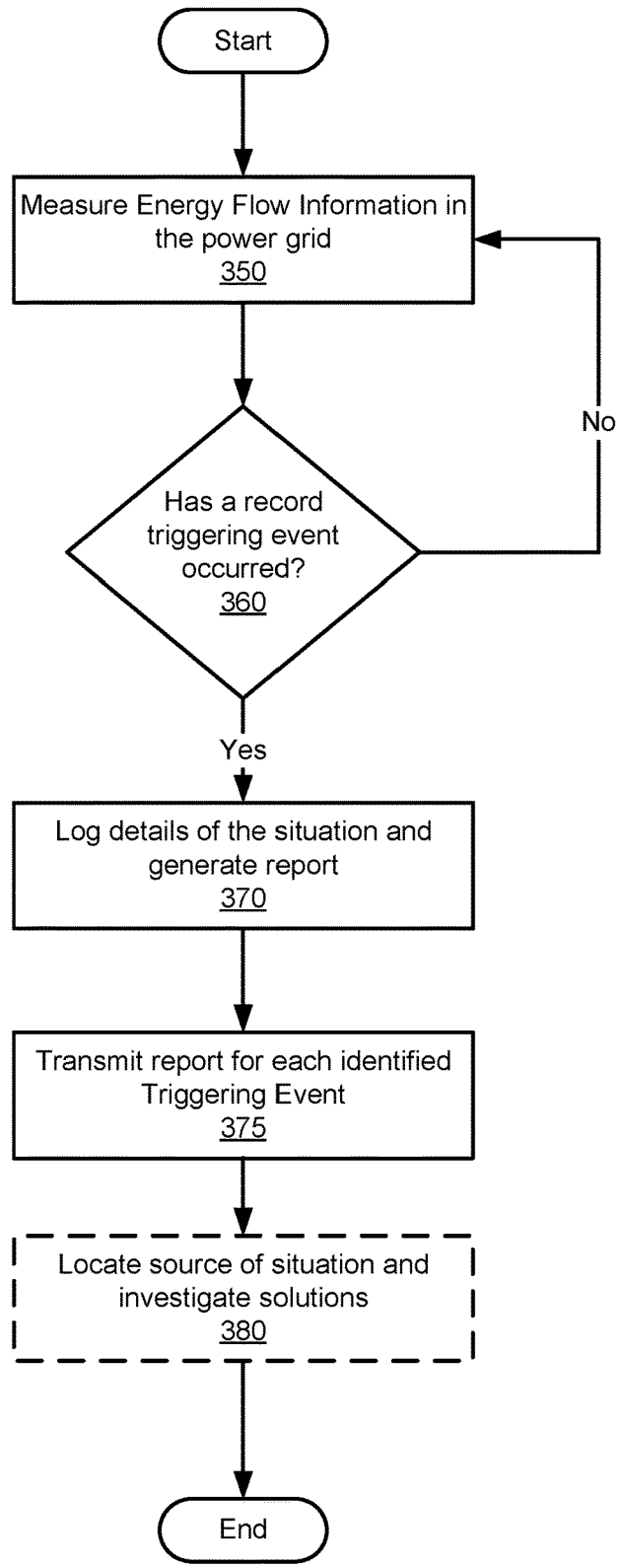
FIG. 3 is a flowchart illustrating operations for determining stability problem areas on the power grid in accordance with various embodiments of the present inventive concept.

Referring now to FIG. 3, a flowchart illustrating operations for generating reports and providing solutions in accordance with embodiments of the present inventive concept will be discussed. As illustrated in FIG. 3, operations begin at block 350 by measuring energy flow information in the power grid. As discussed above, this energy flow information may be any type of information about the power grid that may inform a user about the health of the system. Once the information is collected, this energy flow information is used to monitor the system and the related devices and loads for a report triggering event (block 360). Examples of report triggering events are discussed above, however, embodiments of the present inventive concept are not limited thereto. For example, wherein the report triggering events may include at least a predetermined number of load flow transitions where energy flows back from a load associated with the power grid to the power grid during the predetermined period of time or exceeding a threshold of time where an energy flow phase angle between voltage and current remains at or near 90 or 270 degrees indicating pure volt-ampere reactive (VAR) operation during the predetermined period of time. These are examples only and do not limit embodiments of the present inventive concept.

If it is determined that a report triggering event has occurred (block 360), the condition is logged and a report is generated (block 370). A report may be generated for each of the identified report triggering events. In some embodiments, the report includes a location indicating where the report triggering event occurred in the power grid. The report is then transmitted to a remote location, for example, a utility (block 375). Once the report is received, the particular situation may be investigated, and the source of the situation may be located and dealt with (block 380). For example, if the report is generated because too much power is being flowed back into the system due to solar panels at the load, a storage unit may be provided locally to house the additional power so that it does not produce an instability in the system. If at block 360 it is determined that a report triggering event has not occurred, operations return to 350 and repeat until a report triggering event is detected. The operations discussed with respect to FIG. 3 are provided as examples only and embodiments of the present inventive concept are not limited thereto. As shown, block 380 is illustrated in dotted lines indicating the optional nature of locating a source and investigating solutions. Once the report is generated and transmitted the recipient of the report can use the report however they desire without departing from the scope of the present inventive concept.

Figure 4:
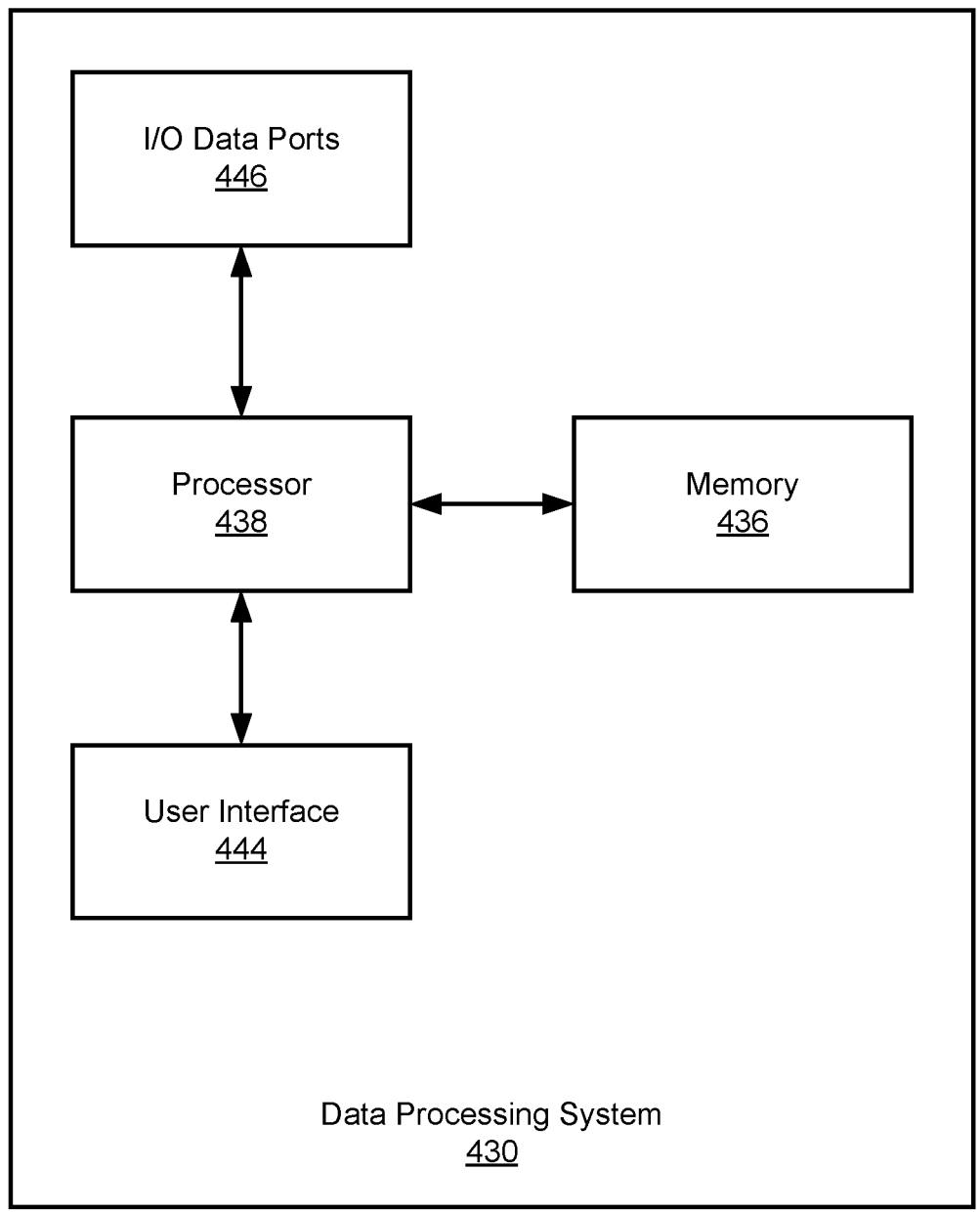
FIG. 4 is a block diagram of a data processing system in accordance with some embodiments of the present inventive concept.

As is clear from the embodiments discussed above, some aspects of the present inventive concept may be implemented by a data processing system. The data processing system may be included at any module of the system without departing from the scope of the preset inventive concept. Exemplary embodiments of a data processing system 430 configured in accordance with embodiments of the present inventive concept will be discussed with respect to FIG. 4. The data processing system 430 may include a user interface 444, including, for example, input device(s) such as a keyboard or keypad, a display, a speaker and/or microphone, and a memory 436 that communicate with a processor 438. The data processing system 430 may further include I/O data port(s) 446 that also communicates with the processor 438. The I/O data ports 446 can be used to transfer information between the data processing system 430 and another computer system or a network using, for example, an Internet Protocol (IP) connection. These components may be conventional components such as those used in many conventional data processing systems, which may be configured to operate as described herein.

As discussed briefly above, some embodiments of the present inventive concept provide methods, systems and computer program products that allow problem areas in the grid to be identified that are causing the grid to be unstable. For example, if the renewable source of power, for example, solar or wind, is provided the exact amount of power that is required by the load, the power grid is just delivering vars for a long period of time. If this condition is identified using embodiments discussed herein, the situation may be remedied. For example, the system can be adjusted so only a little power is delivered so the system is not just delivering Vars. Thus, embodiments of the present inventive concept may allow the whole system to operate in a more predictable manner by pinpointing the problem.

As will be appreciated by one of skill in the art, the inventive concept may be embodied as a method, data processing system, or computer program product. Accordingly, the present inventive concept may take the form of an entirely hardware embodiment or an embodiment combining software and hardware aspects all generally referred to herein as a "circuit" or "module." Furthermore, the present inventive concept may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present inventive concept may be written in an object-oriented programming language such as Java®, Smalltalk or C++. However, the computer program code for carrying out operations of the present inventive concept may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part above with reference to a flowchart illustration and/or block diagrams of methods, systems and computer program products according to embodiments of the inventive concept. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for identifying report triggering events in a power grid to improve stability in the power grid, the method comprising:

measuring energy flow information in the power grid;

identifying report triggering events in the measured energy flow information during a predetermined period of time, wherein the report triggering events include at least a predetermined number of load flow transitions where energy flows back from a load associated with the power grid to the power grid during the predetermined period of time and/or exceeding a threshold of time where an energy flow phase angle between voltage and current remains at or near 90 or 270 degrees indicating pure volt-ampere reactive (VAR) operation during the predetermined period of time;

generating a report associated with each of the identified report triggering events, the report including a location indicating where the report triggering event occurred in the power grid; and transmitting reports for each of the identified report triggering events.

2. The method of claim 1, wherein generating the report is preceded by storing the energy flow information.

3. The method of claim 1, wherein transmitting is followed by:

receiving the report including the location indicating where the report triggering event occurred in the power grid;

investigating the report triggering event; and generating one or more solutions to the report triggering event, wherein executing one of the report triggering events improves the stability of the power grid.

4. The method of claim 3, wherein one of the one or more solutions comprises one of providing local storage in locations of the power grid that are producing excess energy and disconnecting a local generator to prevent excess energy delivery to the power grid.

5. The method of claim 1, wherein the predetermined number of load flow transitions changes based on a time of day.

6. The method of claim 1, the method further comprises:

determining an amplitude of current during the predetermined period of time;

determining if the determined current amplitude exceeds a predetermined threshold; and generating a report for the determined current amplitude if it exceeds the predetermined threshold rendering this a report triggering event.

7. The method of claim 1, wherein determining if at least a predetermined number of load flow transitions where energy flows back from a load associated with the power grid to the power grid during the predetermined period of time have occurred further comprises determining if at least a predetermined number of load flow transitions having a specific step size, wherein the step size is one of a size of change in phase-angle of power; a total change in watts from delivered to received or received to delivered; and the load flow transition exceeds a fixed threshold of watts where a threshold sits on a watts delivered line and a watts received line.

8. The method of claim 1:

wherein the predetermined number of transitions comprises at least three successive measurements, within which a quadrant 1 (Q1) to quadrant 2 (Q2) or a Q2 to Q1 transition exists; and wherein a total transition step is greater than at least N degrees per the total predetermined period of time, wherein N is any number greater than zero; and/or wherein the predetermined number of transitions comprises at least three successive measurements, within which a quadrant 3 (Q3) to quadrant 4 (Q4) transition or Q4 to Q3 transition exist; and wherein the total transition step is greater than at least N degrees per the total predetermined period of time, wherein N is any number greater than zero.

9. The method of claim 8, wherein the predetermined period of time is no greater than 1 second.

10. A system including a power grid that includes both conventional finite power sources and renewable power sources, the system being configured to identifying report triggering events in a power grid to improve stability in the power grid by:

measuring energy flow information in the power grid;

identifying report triggering events in the measured energy flow information during a predetermined period of time, wherein the report triggering events include at least a predetermined number of load flow transitions where energy flows back from a load associated with the power grid to the power grid during the predetermined period of time and/or exceeding a threshold of time where an energy flow phase angle between voltage and current remains at or near 90 or 270 degrees indicating pure volt-ampere reactive (VAR) operation during the predetermined period of time;

generating a report associated with each of the identified report triggering events, the report including a location indicating where the report triggering event occurred in the power grid; and transmitting reports for each of the identified report triggering events.

11. The system of claim 10, wherein generating the report is preceded by storing the energy flow information.

12. The system of claim 11, wherein transmitting is followed by:

receiving the report including the location indicating where the report triggering event occurred in the power grid;

investigating the report triggering event; and generating one or more solutions to the report triggering event, wherein executing one of the report triggering events improves the stability of the power grid.

13. The system of claim 12, wherein one of the one or more solutions comprises one of providing local storage in locations of the power grid that are producing excess energy and disconnecting a local generator to prevent excess energy delivery to the power grid.

14. The system of claim 10, wherein the predetermined number of load flow transitions changes based on a time of day.

15. The system of claim 10, wherein the system is further configured to:

determine an amplitude of current during the predetermined period of time;

determine if the determined current amplitude exceeds a predetermined threshold; and generate a report for the determined current amplitude if it exceeds the predetermined threshold rendering this a report triggering event.

16. The system of claim 10, wherein determining if at least a predetermined number of load flow transitions where energy flows back from a load associated with the power grid to the power grid during the predetermined period of time have occurred further comprises determining if at least a predetermined number of load flow transitions having a specific step size, wherein the step size is one of a size of change in phase-angle of power; a total change in watts from delivered to received or received to delivered; and the load flow transition exceeds a fixed threshold of watts where a threshold sits on a watts delivered line and a watts received line.

17. The system of claim 10:
wherein the predetermined number of transitions comprises at least three successive measurements, within which a quadrant 1 (Q1) to quadrant 2 (Q2) or a Q2 to Q1 transition exists; and
wherein a total transition step is greater than at least N degrees per the total predetermined period of time, wherein N is any number greater than zero; and/or
wherein the predetermined number of transitions comprises at least three successive measurements, within which a quadrant 3 (Q3) to quadrant 4 (Q4) transition or Q4 to Q3 transition exist; and
wherein the total transition step is greater than at least N degrees per the total predetermined period of time, wherein N is any number greater than zero.

18. The system of claim 17, wherein the predetermined period of time is no greater than 1 second.

* * * * *